United States Patent [19]
Klaue

[11] 3,943,780
[45] Mar. 16, 1976

[54] PLANETARY GEAR DRIVE WITH POWER DISTRIBUTION

[76] Inventor: Hermann Klaue, Tour d'Ivoire 24 e, 1820 Montreux, Switzerland

[22] Filed: July 18, 1974

[21] Appl. No.: 489,544

[52] U.S. Cl. .................. 74/15.86; 74/395; 74/410; 74/750 R; 74/785; 74/801
[51] Int. Cl. ..... F16h 37/00; F16h 57/00; F16h 1/28
[58] Field of Search .......... 74/781 R, 785, 792, 395, 74/396, 398, 399, 392, 801, 750 R, 410, 411, 15.4, 15.66, 15.86

[56] References Cited
UNITED STATES PATENTS

| | | | |
|---|---|---|---|
| 874,580 | 12/1907 | Farkas et al. | 74/781 R |
| 2,066,952 | 1/1937 | Tornebohm | 74/750 R |
| 2,703,021 | 3/1955 | Stoeckicht | 74/801 X |
| 2,936,655 | 5/1960 | Peterson et al. | 74/410 X |
| 3,011,365 | 12/1961 | Stoeckicht | 74/801 |
| 3,257,869 | 6/1966 | Sharples | 74/801 |
| 3,293,948 | 12/1966 | Jarchow et al. | 74/801 |
| 3,545,296 | 12/1970 | Eggins | 74/410 |
| 3,772,934 | 11/1973 | Warren | 74/410 |

FOREIGN PATENTS OR APPLICATIONS

| | | | |
|---|---|---|---|
| 1,216,645 | 2/1963 | Germany | 74/801 |
| 1,207,148 | 9/1970 | United Kingdom | 74/801 |

*Primary Examiner*—Benjamin W. Wyche
*Assistant Examiner*—Lance W. Chandler
*Attorney, Agent, or Firm*—Stevens, Davis, Miller & Mosher

[57] ABSTRACT

An improved planetary gear drive, employing multiple countershafts to reduce the loads carried by the individual components, is disclosed wherein at least one helical gear set having sets of oppositely inclined oblique teeth is mounted for axial movement on a common shaft to transmit power from a drive component to a power component. A compression spring, disposed contiguous with one face of the helical gear set, cooperates with the oppositely inclined teeth of the helical gear set to resiliently move the helical gear set axially along its shaft to equalize the axial force components on its oppositely skewed sets of teeth. The invention may be embodied at any one of several different points in the gear train.

8 Claims, 5 Drawing Figures

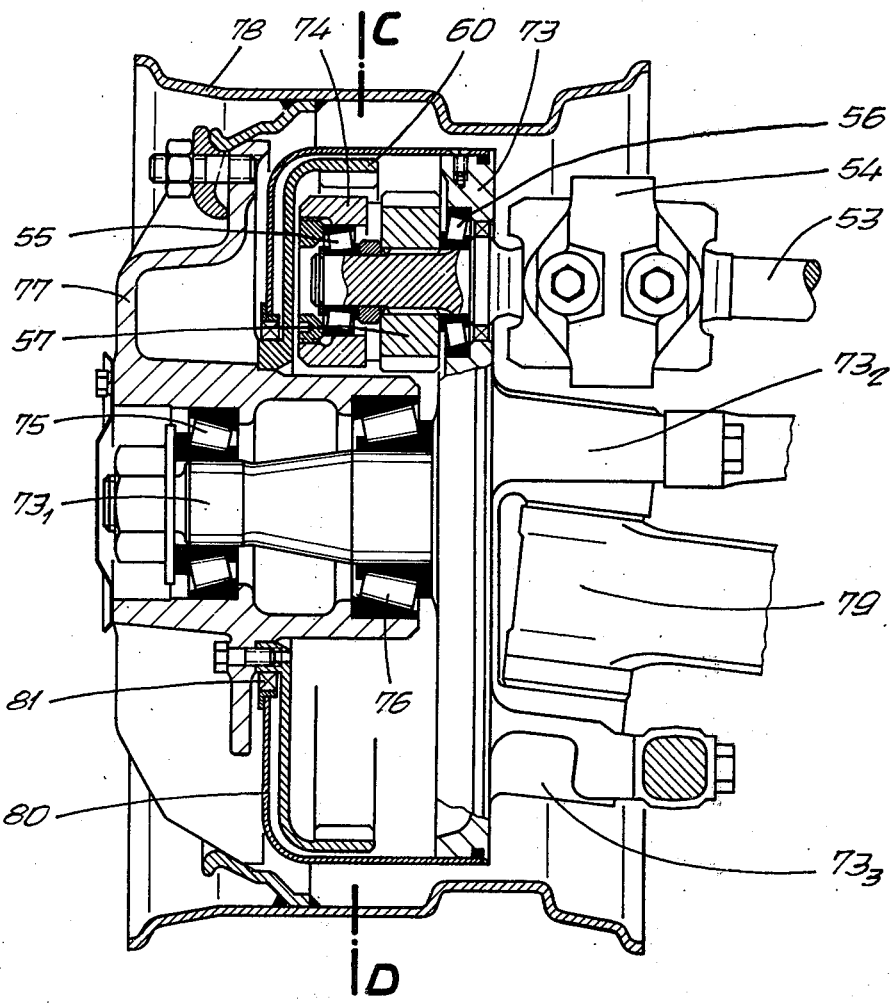
Fig.3 (A-B)

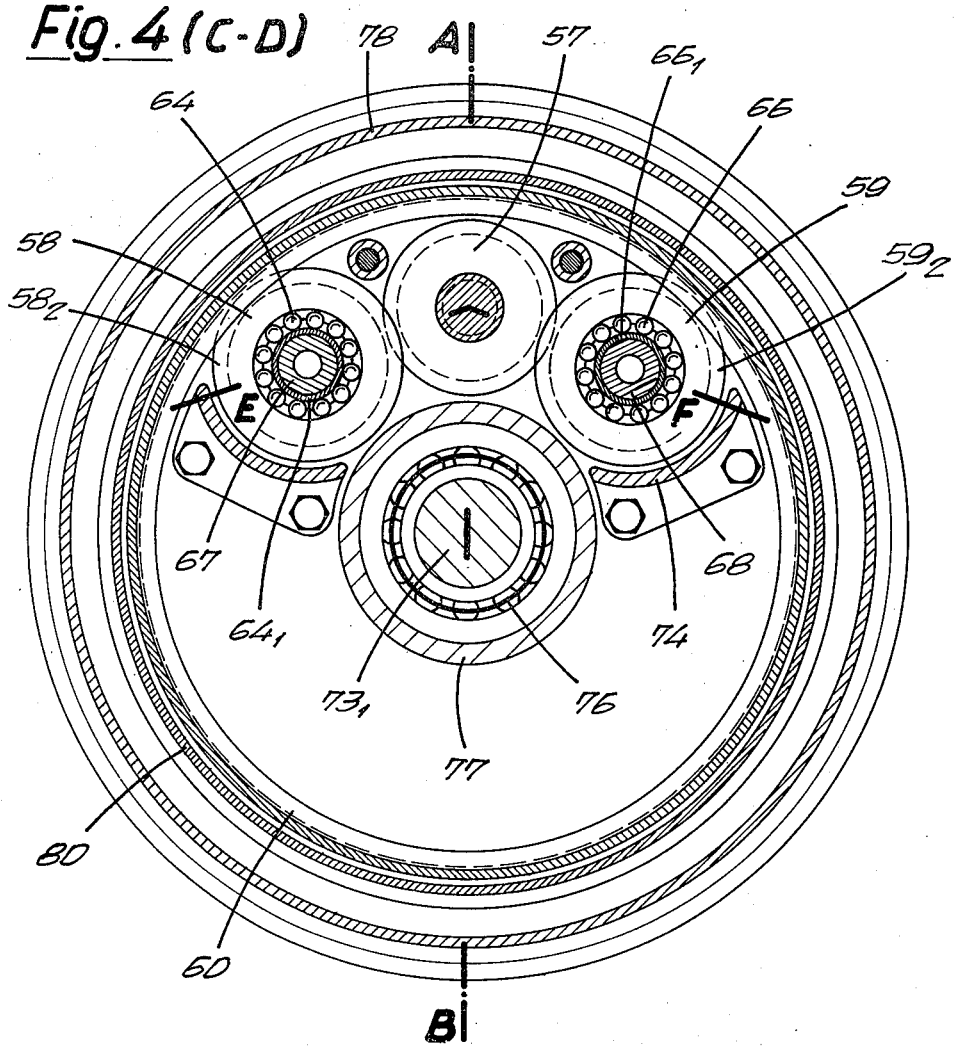
Fig.4 (C-D)
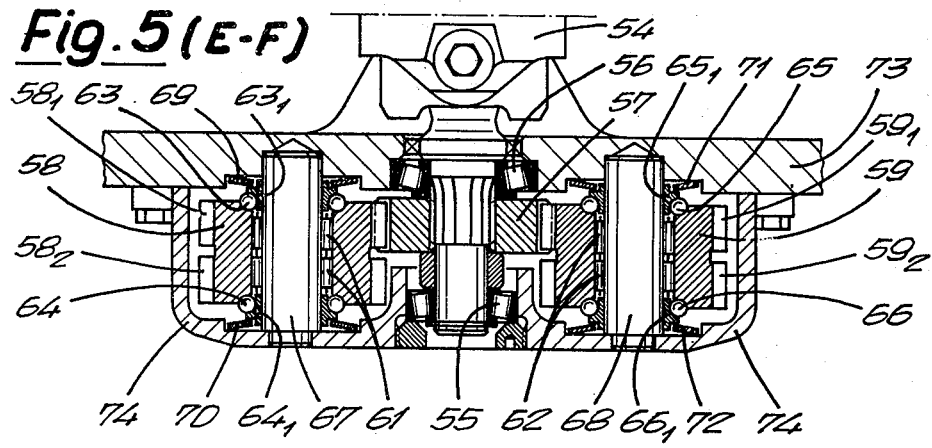
Fig.5 (E-F)

PLANETARY GEAR DRIVE WITH POWER DISTRIBUTION

In a heavy duty transmission the distribution of driveshaft power along multiple countershafts is advantageous because it reduces the forces and torque acting on the individual components and particularly on the enmeshed teeth of the mating gears.

Such a design, however, requires that the gears, and supporting bearings be machined to dimensions within very narrow tolerances. In order that the parts of such a multiple-counter-shaft transmission design need be made only to conventional tolerances, it has been the practice to avoid gear-bearings on the centeral fixed shaft. It is conventional even for planetary drives to omit a bearing for the sun-gear or to resiliently support the planetary gears radially on the ring gear in order to achieve an equal distribution of the torque along all the lines of power distribution.

Such a solution to the problem has the disadvantage that oscillations and noise are produced by the resiliently supported planetary gears. Furthermore, such gear drives must be relatively large because the bearings of the resiliently supported gears must be located as far away as possible from the point at which the teeth of such resiliently supported gears mesh.

It is an object of this invention to avoid these disadvantages while providing for an internal division of power in gear drives without the need for machining the individual components to tolerances exceeding conventional finishing tolerances, and without causing oscillations and noise due to resilient suspension of the planetary gears.

In accordance with this invention, a transmission having split double helical gears and power distribution gear is provided in which at least one of the drive gears and the power gear have teeth which are oppositely obliquely disposed with respect to the axes of the gear wheels so that the forces exerted by the driving gear through its teeth to the power gear while under load are biased by springs in an axial direction so that the axial force components of the drive gear teeth are equalized with the axial force component of the teeth of the power gear.

When utilizing this arrangement, all gears and shafts of the drive unit may be supported in the conventional manner and the advantages of the power division may be fully utilized.

In one embodiment of the invention, the gears transmitting torque from the drive components to the power components are radially supported at their shafts on roller or needle bearings. Additionally, each of these gears is provided with an axial ball bearing on both of its faces or at least on its compression face, as determined by the angle of the tooth with respect to the axis of the gear wheel. The bearing race is mounted on the gear shaft and is prevented from relative rotational movement with respect to the shaft, but permitted some axial movement. A compression spring or a belleville spring resists axial movement of the race.

The invention will be discussed below by means of embodiments illustrated by the attached drawings.

FIG. 3 is a longitudinally section taken along the line A-B of FIG. 4;

FIG. 4 is a cross-section of a drive gear assembly taken along the line C-D of FIG. 3;

FIG. 5 is a section taken along the line E-F of FIG. 4.

Figure 1:
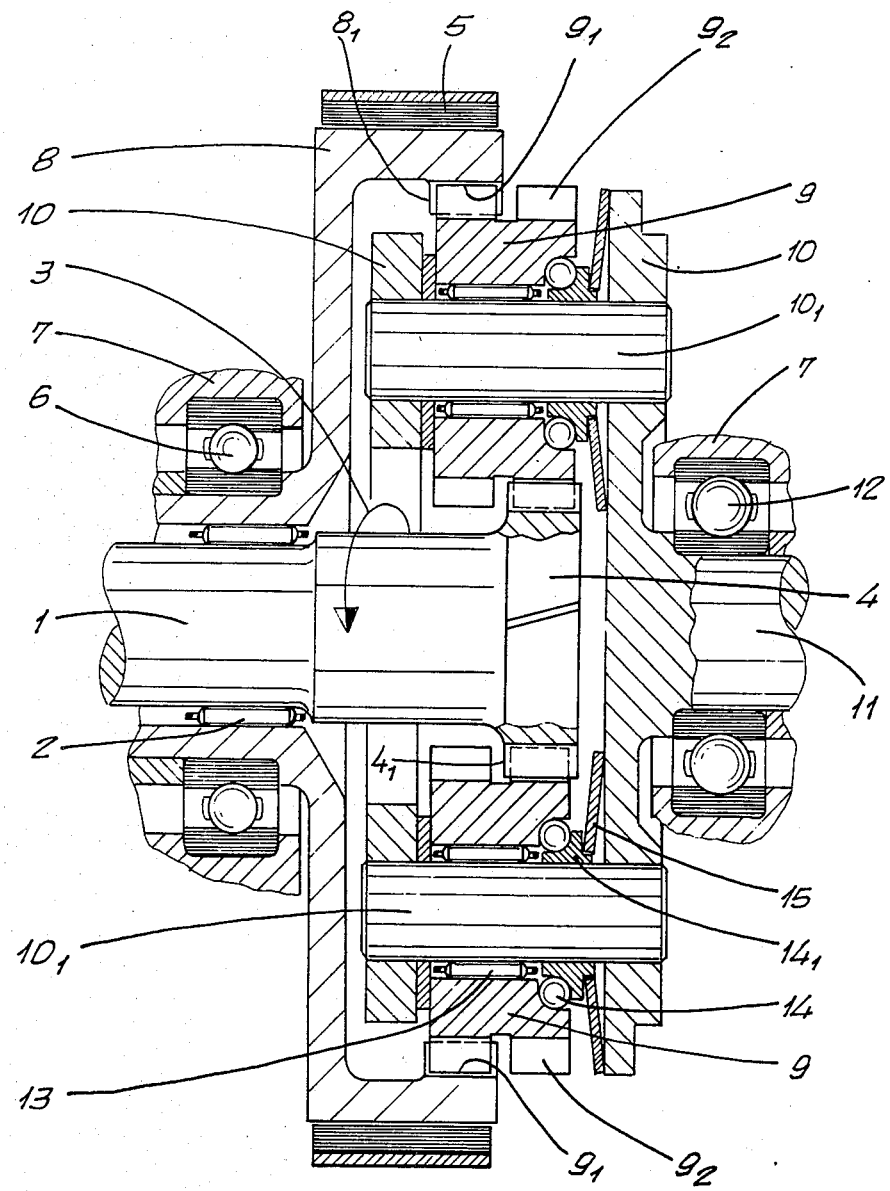
FIG. 1 illustrates in section a planetary drive in lengthwise cross-section, wherein the power distribution takes place through the planetary gears and where these planetary gears are axially and elastically supported on flanged supporting shafts.

Referring now more specifically To FIG. 1, a transmission having a sun gear 4 in a planetary drive system is driven in the direction of arrow 3 by shaft 1. Needle bearings 2 are provided between shaft 1 and a flange of internally toothed ring gear 8. Ring gear 8 is supported by ball-bearings 6 in a housing 7. A brake band 5 about the periphery of ring gear 8 is provided to stop rotation of ring gear 8. Flange 10 supports planetary gears 9 having teeth enmeshed with sun gear 8. Power is transferred from flange 10 to power shaft 11 when ring gear 8 is not rotated and planetary gears 9 rotate about their axis and "walk" between ring gear 8 and sun gear 4. Power shaft 11 is supported by ball-bearings 12 in housing 7. The flange 10 and power-shaft 11 are made of one piece. The planetary gears 9, with oppositely sloped or inclined teeth $9_1$ and $9_2$, are radially supported by needle bearings 13 on flange supported shafts $10_1$. Resilient axial support of the planetary gears 9 is obtained by means of a ball bearing 14 whose inner race $14_1$ is axially movable on the flange-supported shaft $10_1$, and a cooperating belleville spring 15 which abuts flange 10.

In operation of the embodiment of FIG. 1, power supplied through shaft 1 rotates sun gear 4 having oblique teeth $4_1$. Teeth $4_1$ engage teeth $9_2$ of the two planetary gears 9 and rotate the planetary gears 9 which through engagement of teeth $9_1$ with internal teeth $8_1$ carried by ring gear 8 rotate ring gear 8. When a braking action is applied through brake 5, ring gear 8 stops rotating. Planetary gears 9 then rotate about the axis of shaft 1 on sun gear 4 and ring gear 8 causing flange 10 to rotate which causes rotation of shaft 11. The teeth $9_2$ and teeth $4_1$ are inclined with respect to the axis of sun gear 4 in opposite directions so they intermesh. Spring 15 biases bearing races $14_1$ and bearings 14 on shafts 10, towards planetary gears 9, urging the oppositely inclined teeth into engagement.

Figure 2:
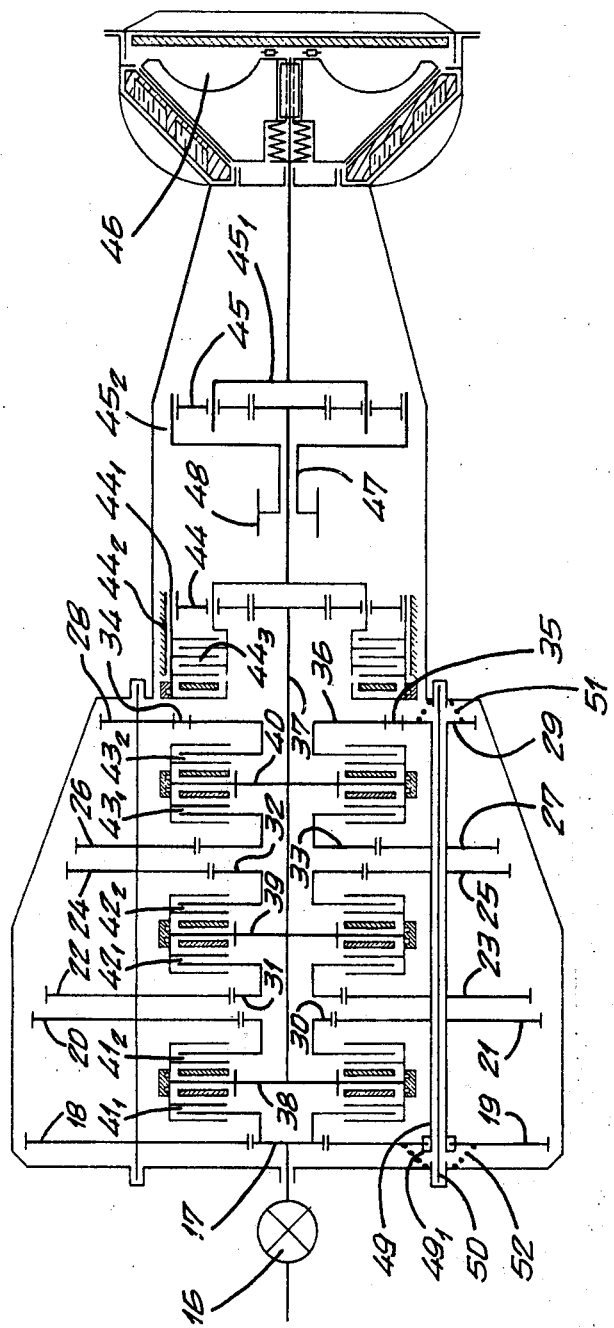
FIG. 2 illustrates a truck transmission gear drive in diagrammatic form, with 10 forward and 2 reverse gear ratios, having two transmission countershafts, and where the gears of one of the transmission countershafts may be axially resiliently supported.

The truck transmission illustrated diagrammatically in FIG. 2 is a clutch-shifted drive with ten forward and two reverse gear ratios and comprises a transmission drive having elements 17–43 and a planetary group drive 44. The transmission drive is provided with a power distribution means having two transmission countershafts with helical transmission gears. The transmission gears of one of the shafts are resiliently supported in the axial direction. The transmission is driven by the engine through a universal coupling 16. Input gear 17 meshes with gears 18 and 19 of the two transmission countershafts which are further equipped with gears 20 through 29. Gears 20 and 21 mesh with gear 30, gears 22 and 23 mesh with gear 31, gears 24 and 25 mesh with gear 32, gears 26 and 27 mesh with gear 33 and gears 28 and 29 by means of reversing gears 34, 35 (not shown) mesh with gear 36 of main shaft 37. Clutch-supports 38, 39, 40 for double clutch couplings $41_1/41_2$, $42_1/42_2$, $43_1/43_2$ are connected with main shaft 37. A total of five forward and one reverse gear ratios are made possible because of the gears and the shift-clutches. Doubling of the number of available ratios is achieved by the use of planetary group drive 44. In the drive 44, the ring gear $44_1$ is prevented from rotation by brake $44_2$ during the first five forward gear ratios and is shunted by a coupling $44_3$ in the upper or second five ratios. Power output is obtained by another planetary drive 45, where flange $45_1$ is connected to a conical brake 46 which is water-cooled and used in low gear. Pinion or planetary gear 45, transmits power through gear $45_2$ and hollow shaft 47 to thereby rotate gear 48 which meshes with the front drive gear (not shown) acting on the distributor differential.

While the countershaft bearing the transmission gears 18, 20, 22, 24, 26, and 28 is a rigid unit with respect to these gears, the other countershaft is designed as a hollow shaft 49 rigidly connected to gears 21, 23, 25, 27 and 29 and is movably supported against the resisting conical spiral spring 51 mounted on axle 50 so that it is solidly mounted in the drive housing. Drive gear 19, whose teeth are obliquely inclined oppositely to the teeth of gears 21, 23, 27, 29, is connected to hollow shaft 49 by a splined-shaft $49_1$ so as to be axially movable and is kept in place by a prestressed conical spiral spring 52.

FIGS. 3 through 5 show a gear-drive for a front wheel drive heavy commercial vehicle. Here, the brake acts on the drive shaft and is mounted at the axle drive (not shown). In order to save weight and to design the narrow space between axle journal and wheel for the transmission of the large low-gear and braking moments, the drive takes place in a power-distributed manner from the drive pinion supported in the wheel via two bilaterally spring-supported intermediate gears to the internally toothed drive gear rotating with the wheel.

As regards the wheel-drive of FIGS. 3, 4, and 5, the drive takes place via the universal-joint shaft 53 which is connected with the axle-drive and the geared brake on the side toward the center of the vehicle, which is not shown. Universal joint 54 drives helical pinion or gear 57 on taper-roller bearings 55 and 56, the teeth of pinion gear 57 meshing with the teeth $58_1$ and $59_1$ of intermediate gears 58 and 59. The oppositely inclined oblique teeth $58_2$ and $59_2$ of intermediate gears 58 and 59 mesh with the inside teeth of ring gear 60 and insure that even distribution of the tooth forces at four meshing points. In order that even distribution of tooth pressure will take place in both directions of rotation that is when the pinion or gear 57 is rotating in the driving as well as in the driven mode, intermediate gears 58 and 59 are spring-supported on both their faces as indicated by FIG. 5. These intermediate gears 58 and 59 are radially supported by needle bearings 61 and 62, and in the axial direction, by thrust ball-bearings 63, 64 and 65, 66 respectively. Ball races $63_1$, $64_1$, $65_1$, $66_1$ centered with the race seats on axles 67 and 68 respectively are supported by the pre-stressed belleville springs 69, 70, 71 and 72.

Pinion 57 is supported on the universal joint side by the taper-roller bearing 56 in axle-journal 73 and on the opposite side by the taper-roller bearing 55 mounted in holding-bracket 74. The bracket 74, together with the axle-journal 73 also supports intermediate-gear shafts or axles 67 and 68, and is bolted to axle journal 73. Axle-trunnion $73_1$, through taper-roller bearings 75 and 76, supports the entire cast wheel-body 77, which is mounted in a conventional manner to rim 78 and is bolted to internally toothed ring gear 60. Axle-journal 73 supports projections $73_2$ and $73_3$ on the side opposite trunnion $73_1$, whereby an axle 79 may be pivotally suspended from those projections. The space between the axle-journal 73 and the wheel-body which includes pinion 57, the two intermediate gears 58 and 59 and also drive gear 60, is sealed by means of sheetcover 80 that is screwed into the axle-journal and a sealing ring 81.

The intermeshing teeth of two gears of the planetary gear system provided by the invention are inclined obliquely in opposite directions at an angle whereby their surfaces contact each other intimately when the teeth of the planetary gear are biased into contact with the teeth of the other gear by the belleville spring.

Although the invention has been described in detail for the purpose of illustration, it is to be understood that such detail is solely for that purpose and that variations can be made therein by those skilled in the art without departing from the scope and spirit of the invention except as it may be limited by the claims.

What I claim is:

1. A gear drive comprising an input shaft, a toothed sun gear disposed on the said shaft for rotation therewith, a housing about the shaft, a ring gear disposed about the shaft and supported by the housing for rotation relative thereto and for rotation of the shaft relative to the ring gear, said ring gear having internal teeth, planetary gears having teeth which intermesh with teeth of the sun gear and teeth which mesh with teeth of the ring gear, a counter-shaft supporting such planetary gear, said planetary gear being axially slidable on the counter-shaft, an output shaft supported by said housing for rotation relative thereto, means comprising spaced flanges fixed to the opposite ends of the countershafts and to the output shaft supporting the countershafts, a bearing disposed between the countershaft and said planetary gear, resilient means for biasing said planetary gears on the countershaft to cause intermeshing of its teeth with those of the sun gear and ring gear, means for braking the ring gear, said teeth of at least one pair of gears having intermeshing teeth being oppositely obliquely disposed relative to the axes of the gears.

2. The gear drive of claim 1 wherein the input shaft is a universal joint shaft connected to an axle drive, a helical toothed sun gear is mounted on the universal joint side of the universal joint shaft on tapered roller bearings, a pair of planetary gears are disposed on opposite sides of the sun gear with teeth intermeshing with those of the sun gear, a ring gear is disposed about the planetary gears with internal teeth meshing with teeth of the planetary gears, said teeth of the ring gear and planetary gears being oblique with respect to the gear axis, said planetary gears being spring supported to insure even distribution of tooth pressure in both directions when the sun gear is rotated.

3. In a gear drive comprising a drive gear and a power take-off gear having teeth which mesh with teeth of the drive gear and absorb tooth-forces from the teeth of the drive gear, the improvement wherein the teeth of the drive gear and power take-off and gear are oppositely inclined helical teeth, said power take-off gear is disposed on a shaft for axially movement relative thereto, and resilient means for urging the teeth into intermeshing relationship with the teeth of the drive gear, whereby said power take-of gear is resiliently mounted on said shaft for axial motion when drive gear rotates until the axial components of the peripheral tooth forces of the drive teeth is in equilibrium with the axial components of the peripheral tooth forces of the power take-off teeth.

4. The gear system of claim 3 wherein the resilient means are belleville springs.

5. The gear system of claim 3 wherein said the drive gear is a sun gear carried on a drive shaft and has obliquely inclined teeth meshed with teeth on planetary gears inclined oppositely to be parallel with the teeth of the sun gear, said planetary gears are radially supported with roller bearings on their countershafts and with ball bearings on the compression side thereof as determined by the direction of inclination of the teeth, said ball bearings comprising a bearing race, and a compression spring biasing said planetary gear teeth into intermeshing contact with the teeth of the sun gear.

6. A planetary gear drive for a vehicle comprising a drive shaft, a sun gear fixed to one end of the drive shaft for rotation therewith, an internally toothed ring gear disposed about the shaft and having a centrally disposed annular flange forming a hub rotatably supported on the drive shaft by needle bearings, a housing, said hub being rotatably supported in the housing with ball bearings, means for braking the ring gear, a power output shaft coaxial with the drive shaft, an annular flange extending radially outwardly from the output shaft and fixed thereto for rotation, said flange on the output shaft being rotatably supported in said housing, circumferentially spaced shafts fixed against relative rotation with the said annular flange on the output shaft and having their longitudinal axes disposed in planes parallel to the axis of the drive shaft and radially spaced from the drive shaft, a planetary gear rotatably mounted with needle bearings on each of the flange supported shafts, said planetary gears having inclined power take-off teeth meshing with the internal teeth of the ring gear and axially spaced oppositely inclined drive teeth meshing with the teeth of the sun gear for power take-off, ball bearings about the flange supported shaft disposed against each planetary gear adjacent to the flange on the output shaft, and belleville springs biasing the ball bearings about the flanged supported shafts towards the planetary gears urging the oppositely inclined teeth into engagement whereby because of the opposite inclination of the planetary gear teeth and the biasing action of said springs the planetary gears move axially under load on the flange supported shafts until the axial forces on the drive teeth are at equilibrium with those of the power take-off teeth.

7. A gear drive comprising a universal joint having a drive shaft and a driven shaft, a helical toothed sun gear mounted on the driven shaft, an axle-journal and a holding bracket, said driven shaft being supported by bearings in the axle-journal at one end and by bearings in the holding bracket, a pair of planetary gears each having axially spaced oppositely inclined oblique first and second teeth, the first teeth meshing with teeth of the sun gear, a ring gear, the said second teeth meshing with teeth on the ring gear, said planetary gears being radially supported by needle bearings and axially supported by axially spaced thrust bearings disposed against each face of the planetary gear, and resilient means supporting the thrust bearings on a planetary gear shaft for biasing the teeth of the planetary gears into contact with the intermeshing teeth of the other gears.

8. The gear drive of claim 7 wherein the resilient means are belleville springs, the planetary gear shafts are supported at one end by the axle journal and at the other end by the holding bracket, said holding bracket is removably secured to the axle journal, a rim, a cast wheel-body mounted on the rim and removably secured to the ring gear, an axle trunnion supporting the cast wheel-body through roller bearings, a pair of projecting members supported by the axle journal on its side opposite the axle trunnion, an axle pivotally suspended from said projections, and means for sealing space between the axle-journal and the wheel body in which the sun gear, the planetary gears and ring gear are disposed.

* * * * *